United States Patent
Chun et al.

(10) Patent No.: US 8,305,985 B2
(45) Date of Patent: Nov. 6, 2012

(54) METHOD OF ALLOCATING UPLINK RADIO RESOURCE

(75) Inventors: Jin Young Chun, Anyang-si (KR); Bin Chul Ihm, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 12/676,597

(22) PCT Filed: Sep. 26, 2008

(86) PCT No.: PCT/KR2008/005709
§ 371 (c)(1),
(2), (4) Date: Mar. 4, 2010

(87) PCT Pub. No.: WO2009/045026
PCT Pub. Date: Apr. 9, 2009

(65) Prior Publication Data
US 2010/0208672 A1    Aug. 19, 2010

(30) Foreign Application Priority Data
Oct. 2, 2007    (KR) .................. 10-2007-0099199

(51) Int. Cl.
*H04W 4/00*    (2009.01)

(52) U.S. Cl. ........................................ 370/329
(58) Field of Classification Search .................. None
See application file for complete search history.

(56) References Cited

U.S. PATENT DOCUMENTS

| | | | |
|---|---|---|---|
| 7,724,773 B2* | 5/2010 | Zhang et al. | 370/468 |
| 2005/0220042 A1 | 10/2005 | Chang et al. | |
| 2006/0251027 A1 | 11/2006 | Chun et al. | |
| 2009/0052387 A1* | 2/2009 | Lee et al. | 370/329 |
| 2010/0046460 A1* | 2/2010 | Kwak et al. | 370/329 |
| 2010/0135273 A1* | 6/2010 | Kim | 370/344 |

FOREIGN PATENT DOCUMENTS
EP    1 655 909 A1    5/2006
* cited by examiner

*Primary Examiner* — Anh-Vu Ly
(74) *Attorney, Agent, or Firm* — McKenna Long Aldridge LLP

(57) ABSTRACT

A method of allocating an uplink radio resource includes transmitting a scheduling request signal for requesting allocation of the uplink radio resource, wherein the scheduling request signal comprises control information, a request of the allocation of the uplink radio resource is represented by transmitting the scheduling request signal and the control information is represented by a value of the scheduling request signal, and receiving a scheduling grant message in response to the scheduling request signal.

3 Claims, 2 Drawing Sheets

METHOD OF ALLOCATING UPLINK RADIO RESOURCE

This application is a 35 U.S.C. §371 National Stage entry of International Application No. PCT/KR2008/005709, filed on Sep. 26, 2008, and claims priority to Korean Application No. 10-2007-0099199, filed on Oct. 2, 2007, each of which is hereby incorporated by reference in its entirety as if fully set forth herein.

TECHNICAL FIELD

The present invention relates to wireless communications, and more particularly, to a method of allocating an uplink radio resource.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

An orthogonal frequency division multiplexing (OFDM) system capable of reducing inter-symbol interference with a low complexity is taken into consideration as one of next generation (after the third generation) systems. In the OFDM system, serial input data symbols are converted into N parallel data symbols and are carried and transmitted on separate N subcarriers. The subcarriers maintain orthogonality in a frequency dimension. Orthogonal channels experience mutually independent frequency selective fading. Inter-symbol interference can be minimized since intervals of transmitted symbols are lengthened. Orthogonal frequency division multiple access (OFDMA) is a multiple access scheme in which multiple access is achieved by independently providing some of available subcarriers to a plurality of users when using a system which employs the OFDM as a modulation scheme. In the OFDMA, frequency resources (i.e., subcarriers) are provided to the respective users, and the respective subcarriers are independently provided to the plurality of users. Thus, the subcarriers generally do not overlap with one another. Eventually, the frequency resources are mutually exclusively allocated to the respective users.

In order to implement various transmission or reception methods to achieve high-speed packet transmission, transmission of a control signal on time, spatial, and frequency domains is an essential and indispensable factor. A channel for transmitting the control signal is referred to as a control channel. A physical layer channel for transmitting control information from a base station (BS) to a user equipment (UE) is referred to as a physical downlink control channel (PDCCH). A physical layer channel for transmitting control information from the UE to the BS is referred to as a physical uplink control channel (PUCCH). The control information transmitted through the PUCCH may be various, e.g., an acknowledgement (ACK)/negative-acknowledgement (NACK) signal which is a response for downlink data transmission, a channel quality indicator (CQI) indicating downlink channel quality, a scheduling request signal for requesting allocation of radio resources, a multiple input multiple output (MIMO) control signal that is multiple antenna related information, etc.

The scheduling request signal is a message used when the UE requests the BS to allocate radio resources for uplink data or downlink data transmission. The BS allocates the radio resources to the UE upon receiving the scheduling request signal from the UE. A scheduling gain can be obtained when the BS can know further detailed information on data required by the UE rather than determining whether the radio resources are allocated according to only a presence/absence of the scheduling request signal.

Accordingly, there is a need for a method of transmitting a scheduling request signal capable of representing a variety of control information.

DISCLOSURE OF INVENTION

Technical Problem

The present invention provides a method of allocating an uplink radio resource by using a scheduling request signal capable of representing a variety of control information.

Technical Solution

In an aspect, a method of allocating an uplink radio resource includes transmitting a scheduling request signal for requesting allocation of the uplink radio resource, wherein the scheduling request signal comprises control information, a request of the allocation of the uplink radio resource is represented by transmitting the scheduling request signal and the control information is represented by a value of the scheduling request signal, and receiving a scheduling grant message in response to the scheduling request signal In another aspect, a method of allocating an uplink radio resource in a wireless communication system performing data transmission using a subframe constructed of a data region for carrying user data and/or control information and a control region for carrying the control information includes receiving a scheduling request signal for requesting allocation of the uplink radio resource, and transmitting a scheduling grant message in response to the scheduling request signal, wherein the scheduling grant message comprises an indicator for indicating whether only the control information is included in the data region.

Advantageous Effects

According to the present invention, a scheduling request signal that requests allocation of a radio resource for data transmission can represent a variety of control information. Therefore, scheduling can be flexibly performed on the radio resource to be allocated to a user equipment.

MODE FOR THE INVENTION

Figure 1:
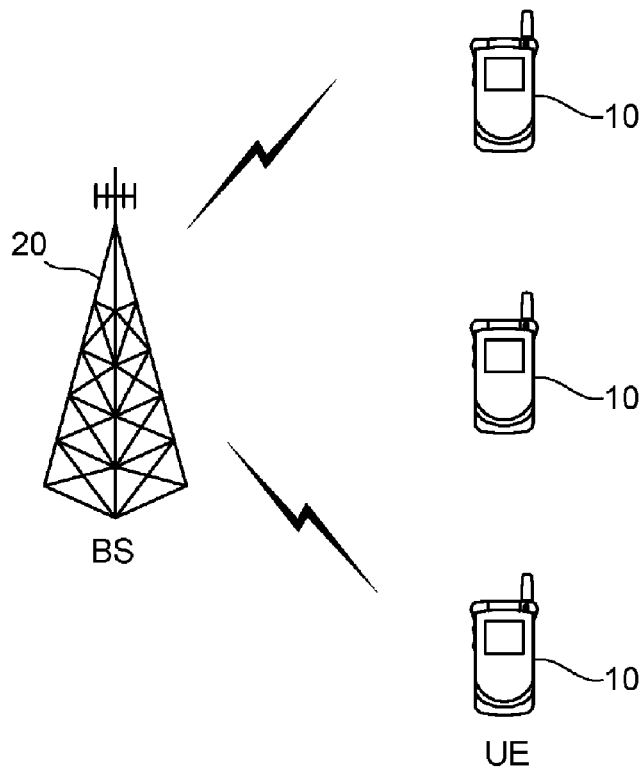
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink (DL) represents a communication link from the BS 20 to the UE 10, and an uplink (UL) represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

There is no restriction on a multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. For clarity, the OFDMA-based wireless communication system will be described hereinafter.

The OFDM scheme uses a plurality of orthogonal subcarriers. Further, the OFDM scheme uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and spectral efficiency can be improved through selective scheduling in a frequency domain by utilizing channel characteristics which are different from one subcarrier to another. An OFDMA scheme is an OFDM-based multiple access scheme. According to the OFDMA scheme, a radio resource can be more efficiently used by allocating different subcarriers to multiple users.

Figure 2:
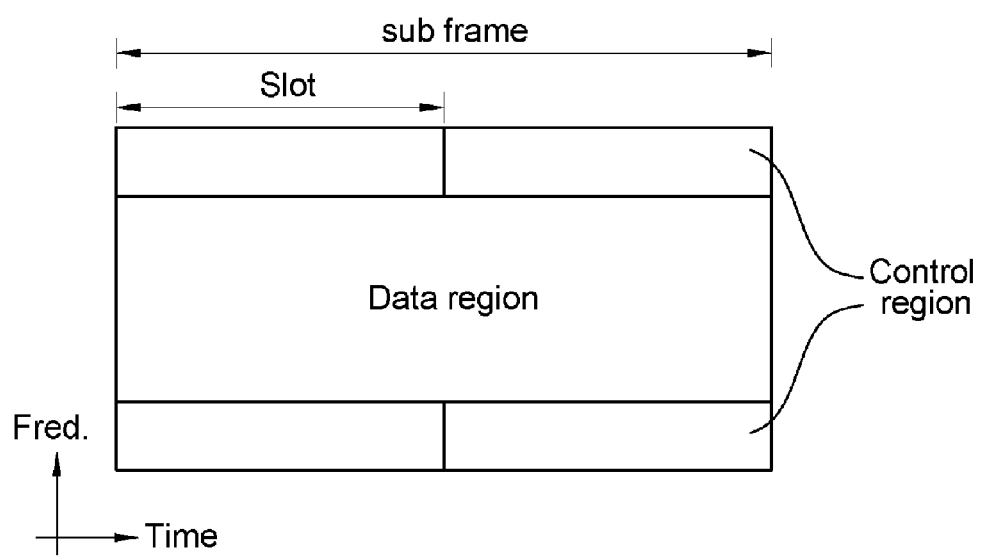
FIG. 2 shows an example of a subframe.

FIG. 2 shows an example of a subframe.

Referring to FIG. 2, the subframe can be divided into a control region and a data region. The control region is for carrying control information. The data region is for carrying user data. The control region and the data region can be constructed of one subframe. Examples of the control information include an acknowledgement (ACK)/negative-acknowledgement (NACK) signal, a channel quality indicator (CQI), a scheduling request signal, a multiple input multiple output (MIMO) control signal, etc. The control region is used to carry the control information alone. The data region is used to carry the user data alone or to carry both the user data and the control information. That is, when the UE transmits the control information alone, the control information can be transmitted through the control region, and when the UE transmits both the user data and the control information, the control information can be transmitted through the control region or can be transmitted through the data region by multiplexing the user data and the control information.

A subframe can include two slots. The slot is a unit of radio resource allocation in a time domain and a frequency domain. One slot can include a plurality of OFDM symbols in the time domain and at least one subcarrier in the frequency domain. For example, one slot can include 7 or 6 OFDM symbols. The subframe can include a plurality of resource blocks (RBs). The RB is a basic unit of radio resources allocated to the UE. The RB can include a plurality of subcarriers. For example, the RB may be a region consisting of 12 contiguous subcarriers in the frequency domain and two slots in the time domain. One radio frame can include 10 subframes. A time for transmitting one subframe is defined as a transmission time interval (TTI). For example, when the TTI is 1 ms, a slot is 0.5 ms and a time for transmitting one radio frame is 10 ms.

The subframe divides a frequency band into 3 parts. Two parts at both ends of the frequency band are used as the control region, and a middle part of the frequency band is used as the data region. Since the control region and the data region use different frequency bands, frequency division multiplexing (FDM) have been achieved. This is for exemplary purposes only, and thus the arrangement of the control region and the data region in the subframe is not limited thereto. In addition, the number of subframes included in the radio frame, the number of slots included in the subframe, and the number of OFDM symbols included in the slot can vary in various ways.

The slot assigned to each UE can be frequency-hopped in the subframe. That is, one of two slots assigned to one UE can be assigned to one side of the frequency band, and the other slot can be assigned to the other side of the frequency band. A frequency diversity gain can be obtained by transmitting the control channel for one UE through the slots assigned to the different frequency bands. In addition, a plurality of users may be multiplexed by code division multiplexing (CDM).

Figure 3:
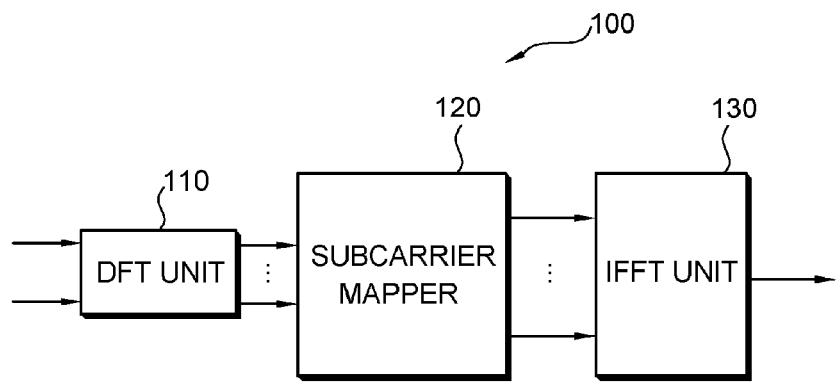
FIG. 3 is a block diagram showing a single carrier frequency division multiple access (SC-FDMA) modulator for transmitting a scheduling request signal according to an embodiment of the present invention.

FIG. 3 is a block diagram showing an SC-FDMA modulator for transmitting a scheduling request signal according to an embodiment of the present invention. The SC-FDMA is a modulation scheme in combination of a discrete Fourier transform (DFT) and an inverse fast Fourier transform (IFFT). Since the SC-FDMA has a single subcarrier property, the SC-FDMA is advantageous over the OFDM using only the IFFT in terms of reducing a peak-to-average power ratio (PAPR).

Referring to FIG. 3, an SC-FDMA modulator 100 includes a DFT unit 110 performing the DFT, a subcarrier mapper 120, and an IFFT unit 130 performing the IFFT. The SC-FDMA modulator 100 may be a part of a transmitter. The transmitter may be a part of a UE in uplink and may be a part of a BS in downlink.

The DFT unit 110 performs the DFT on input data and then outputs a frequency-domain symbol. The data input to the DFT unit 110 may be a data symbol or a bit of a scheduling request signal. The subcarrier mapper 120 allocates an input signal to each subcarrier according to various signal configuration types. The IFFT unit 130 performs the IFFT on an input symbol and then outputs a transmit (Tx) signal. The Tx signal is a time-domain signal. The time-domain signal output through the IFFT unit 130 is referred to as an OFDM symbol. Since the OFDM symbol is generated by performing the IFFT after spreading the symbol through the DFT at a front stage of the IFFT unit 130, the OFDM symbol is also referred to as an SC-FDMA symbol.

Figure 4:
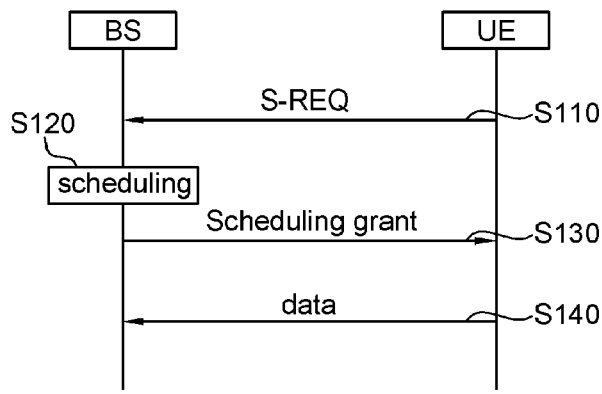
FIG. 4 is a flow diagram showing a radio resource allocation method according to an embodiment of the present invention.

FIG. 4 is a flow diagram showing a radio resource allocation method according to an embodiment of the present invention.

Referring to FIG. 4, a UE transmits a scheduling request (S-REQ) signal to a BS (step S110). The S-REQ signal transmission represents a request of allocation of radio resources. A request of the allocation of the uplink radio resource is represented by transmitting the scheduling request signal. The S-REQ signal can have a value of 1 bit or more. The bit value of the S-REQ signal can be used to represent a plurality of pieces of control information. That is, the S-REQ signal includes other control information along with the request of radio resource allocation. The control information can indicate detailed requirements on the radio resource allocation. The control information that can be represented with the S-REQ signal may indicate a size of uplink data, whether the uplink data is urgency data, whether the uplink data includes only control signals, etc.

Table 1 shows an example of the control information represented with the S-REQ signal.

TABLE 1

| UL control signal | bits (size) | comment |
| --- | --- | --- |
| S-REQ (scheduling request) | 1 | If 0, small data<br>If 1, large data |

The S-REQ signal can represent a size of uplink data to be transmitted by the UE. When the S-REQ signal is expressed using 1 bit, a bit value of '0' may indicate that the uplink data is small data having a size smaller than a reference value, and a bit value of '1' may indicate that the uplink data is large data having a size larger than the reference value. On the contrary, the bit value of '1' may indicate that the uplink data is small data having a size smaller than the reference value, and the bit value of '0' may indicate that the uplink data is large data having a size larger than the reference value. The reference value is provided for a resource region allocated by the BS to the UE. The reference value can be a predetermined default value or may be reported by the BS to the UE. The reference value may be determined according to the number of UEs that can be accommodated by the BS or the number of UEs currently receiving a communication service from the BS, a type of data transmitted between the BS and the UE, etc. For example, if the number of UEs currently receiving the communication service from the BS is small, more amount of resources can be allocated to one UE. Therefore, the reference value can be determined to be a large value. If data to be transmitted by the UE is small data such as voice data, a small reference value is used. In case of large data such as video data, a large reference value can be used.

Table 2 shows another example of the control information represented with the S-REQ signal.

TABLE 2

| UL control signal | bits (size) | comment |
| --- | --- | --- |
| S-REQ (scheduling request) | 1 | If 0, delay data<br>If 1, urgency data |

The S-REQ signal can indicate an urgency of uplink data to be transmitted by the UE. When it is assumed that the S-REQ signal is expressed using 1 bit, a bit value of '0' may indicate that the uplink data is not urgency data, that is, the uplink data is delay data that can be transmitted with delay. In addition, a bit value of '1' may indicate that the uplink data is urgency data. On the contrary, the bit value of '0' may indicate that the uplink data is urgency data, and the bit value of '1' may indicate that the uplink data is not urgency data, that is, the uplink data is delay data. The urgency data may include voice or video data to be transmitted on a real-time basis such as voice communication or video communication. The urgency data may also include data transmitted and received in real-time online games. The delay data may be data for a short message service (SMS), a mail service, etc., in which quality of communication services are insensitive to a certain level of delay.

Table 3 shows another example of the control information represented with the S-REQ signal.

TABLE 3

| UL control signal | bits (size) | comment |
| --- | --- | --- |
| S-REQ (scheduling request) | 1 | If 0, UL control only<br>If 1, UL data (data + control) |

The S-REQ signal can indicate whether uplink data to be transmitted by the UE includes only the control signal. When the S-REQ signal is expressed using 1 bit, a bit value of '0' may indicate that the uplink data includes only a control signal (i.e., UL control only), and a bit value of '1' may indicate that the uplink data includes user data (i.e., UL data) or includes the user data and the control signal (i.e., data+control). On the contrary, the bit value of '0' may indicate that the uplink data includes the user data (i.e., UL data) or includes the user data and the control signal (i.e., data+control), and the bit value of '1' may indicate that the uplink data includes only the control signal (i.e., UL control only).

Radio resource allocation is not requested only with the presence/absence of the S-REQ signal. Instead, scheduling of radio resources to be allocated to the UE can be further adaptively achieved when the S-REQ signal is used to represent various control signals. The BS can easily estimate a size of resources to be allocated to a plurality of UEs when the UEs report a size of uplink data to the BS by using the S-REQ signal. The BS can select a UE to which the resources are first allocated among the plurality of UEs when the UEs report an urgency state of the uplink data by using the S-REQ signal. In addition, the BS can determine whether the resources will be allocated to a control region or a data region of the UE when the UE informs whether only the control signal is included in data to be transmitted. Accordingly, the BS can obtain detailed information from the S-REQ signal transmitted by the UE and thus can perform adaptive scheduling of resources to be allocated to the UE.

Although it has been described above that the S-REQ signal has a size of 1 bit, this is for exemplary purposes only, and thus the present invention is not limited thereto. The S-REQ signal may have a size of 2 bits of more to indicate information such as a size of uplink data, an urgency state, whether the uplink data includes only the control signal, or the like. In addition thereto, the S-REQ signal may represent a variety of information. For example, if the S-REQ signal is expressed using 2 bits, a least significant bit (LSB) may indicate a presence/absence of scheduling request, and a most significant bit (MSB) may indicate a hybrid automatic repeat request (HARM) ACK/NACK for downlink data.

The BS schedules the radio resources to be allocated to the UE according to the S-REQ signal (step S120). The BS may schedule the radio resources by utilizing information indicated by the S-REQ signal.

In response to the S-REQ signal, the BS transmits a scheduling grant message (step S130). If the UE requests a radio resource for uplink data, the scheduling grant message includes information regarding uplink radio resources allocated to the UE.

The UL scheduling grant message may include indicator information indicating usage of the data region. Table 4 shows an example of an indicator that indicates information included in the UL scheduling grant message.

TABLE 4

| Indicator | bits (size) | comment |
| --- | --- | --- |
| data region usage | 1 | If 0, used to transmit UL data (data + control)<br>If 1, used to transmit UL control |

When the data region usage indicator has a size of 1 bit, a bit value of '0' may indicate that the data region is used to transmit user data or to transmit the user data and the control signal, and a bit value of '1' may indicate that the data region is used to transmit only the control signal. On the contrary, the bit value of '0' may indicate that the data region is used to transmit only the control signal, and the bit value of '1' may indicate that the data region is used to transmit the user data or to transmit the user data and the control signal. Although it has been assumed that the data region usage indicator has a size of 1 bit, this is for exemplary purposes only. Thus, information indicating the data region usage may has various number of bits. According to the data region usage indicator, the UE can transmit data by carrying the user data and/or the control signal on the data region allocated to the UE.

The UL scheduling grant message may include an indicator for a virtual MIMO. Table 5 shows an example of another indicator included in the UL scheduling grant message.

TABLE 5

| Indicator | bits (size) | comment |
| --- | --- | --- |
| Virtual MIMO | 1 | If 0, virtual MIMO is not used or $1^{st}$ UE of virtual MIMO is scheduled<br>If 1, $2^{nd}$ UE of virtual MIMO is scheduled |

When only the control signal is carried on the data region, since the control signal is not large in size, a plurality of users can be used through multiplexing in one allocated data region. A virtual MIMO technique is one example of user multiplexing methods. In the virtual MIMO technique, a transmitter transmits the same signal through multiple subcarriers consisting of a group of subcarriers without using physical multiple antennas, and a receiver regards subcarriers that are repeated during one group of subcarriers as signals received through the virtual multiple antennas. According to the virtual MIMO technique, the BS can demodulate multi-user signals received through one data region. It is assumed herein that the virtual MIMO technique is used for signals received from two UEs.

If the virtual MIMO indicator has a size of 1 bit, a bit value of '0' may indicate that the virtual MIMO technique is not used or that the data region is allocated to a $1^{st}$ UE using the virtual MIMO technique, and a bit value of '1' may indicate that the data region is allocated to a $2^{nd}$ UE using the virtual MIMO technique. On the contrary, the bit value of '0' may indicate that the data region is allocated to the $2^{nd}$ UE using the virtual MIMO technique, and the bit value of '1' may indicate that that the virtual MIMO technique is not used or that the data region is allocated to the $1^{st}$ UE using the virtual MIMO technique. Although it has been assumed that information indicating the virtual MIMO technique has a size of 1 bit, this is for exemplary purposes only. Thus, the number of bits for expressing the virtual MIMO indicator may be various. For example, if the virtual MIMO indicator has a size of 2 bits, the information indicating the virtual MIMO technique may be used for four UEs.

The UE can know the data region allocated to the UE itself according to the scheduling grant message, and thus transmits the UL data through the allocated data region (step S140).

Figure 5:
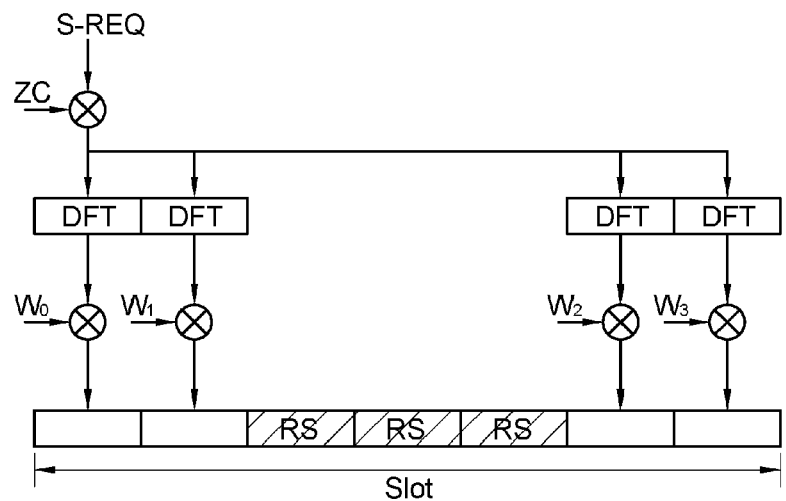
FIG. 5 shows a method for carrying a scheduling request signal on a subframe according to an embodiment of the present invention.

FIG. 5 shows a method for carrying a scheduling request signal on a subframe according to an embodiment of the present invention.

Referring to FIG. 5, a scheduling request (S-REQ) signal is modulated using an orthogonal sequence. The modulated signal may be spread over a plurality of OFDM symbols. The orthogonal sequence denotes a sequence having an excellent correlation property. One example of the orthogonal sequence is a constant amplitude zero auto-correlation (CAZAC) sequence. It is assumed herein that a Zadoff-Chu (ZC) sequence belonging to the CAZAC sequence is used.

The modulated signal is converted to a frequency-domain symbol through discrete Fourier transform (DFT). The frequency-domain symbol is multiplied by a different format of orthogonal sequence. The different format of orthogonal sequence may be a Walsh Hadamard sequence. Symbols, which have been subjected to two times of multiplication of the orthogonal sequence, are mapped to respective OFDM symbols included in one slot. Thereafter, Tx signals are formed by performing inverse fast Fourier transform (IFFT) on all subcarriers, and then the Tx signals are transmitted. A reference signal (RS) may be mapped to three OFDM symbols in the middle of the slot. For a plurality of users, orthogonality may be maintained in the symbols subjected to two times of multiplication of the orthogonal sequence. As such, the S-REQ signal consisting of a plurality of OFDM symbols can indicate detailed information. In addition, by using a plurality of orthogonal sequences, the S-REQ signal can be multiplexed with another control signal such as a CQI, an ACK/NACK signal, etc.

The orthogonal sequence in use is for exemplary purposes only, and thus the present invention is not limited thereto. Therefore, various orthogonal sequences having excellent correlation properties may also be used. In addition, the location and number of OFDM symbols mapped with the S-REQ signal and OFDM symbols mapped with the RS may change variously.

The invention claimed is:

1. A method of allocating an uplink radio resource in a wireless communication system performing data transmission using a subframe constructed of a data region for carrying user data and/or control information and a control region for carrying the control information, the method comprising:
    receiving a scheduling request signal for requesting allocation of the uplink radio resource; and
    transmitting a scheduling grant message in response to the scheduling request signal, wherein the scheduling grant message comprises an indicator for indicating whether only the control information is included in the data region.

2. The method of claim 1, wherein, if the data region is used to transmit only a control signal, the scheduling grant message comprises an indicator for indicating whether a virtual multiple input multiple output (MIMO) technique is used.

3. The method of claim 1, wherein the scheduling request signal comprises control information, a request of the allocation of the uplink radio resource is represented by transmitting the scheduling request signal and the control information is represented by a value of the scheduling request signal.

* * * * *